No. 867,571. PATENTED OCT. 8, 1907.
E. L. CLAUS.
GAS COCK.
APPLICATION FILED MAY 11, 1907.

Witnesses:
Fred Palm
George Felber

Inventor:
Emil L. Claus
By Oliphant & Young
Attorneys.

UNITED STATES PATENT OFFICE.

EMIL L. CLAUS, OF MILWAUKEE, WISCONSIN.

GAS-COCK.

No. 867,571.　　　Specification of Letters Patent.　　　Patented Oct. 8, 1907.

Application filed May 11, 1907. Serial No. 373,131.

*To all whom it may concern:*

Be it known that I, EMIL L. CLAUS, a citizen of the United States, and a resident of Milwaukee, in the county of Milwaukee and State of Wisconsin, have invented certain new and useful Improvements in Gas-Cocks; and I do hereby declare that the following is a full, clear, and exact description thereof.

The object of my invention is to provide a simple, effective and safe stop-cock for gas-stoves or the like, the combination and arrangement of parts being such that the cock is locked when closed, requiring a manual operation to unlock the same before gas can be admitted to the burners, the locking operation of said cock being automatic, upon operation of the aforesaid cock to shut off the gas-supply.

The invention therefore consists in various peculiarities of construction and combination of parts as hereinafter fully set forth with reference to the accompanying drawings and subsequently claimed.

Figure 1:
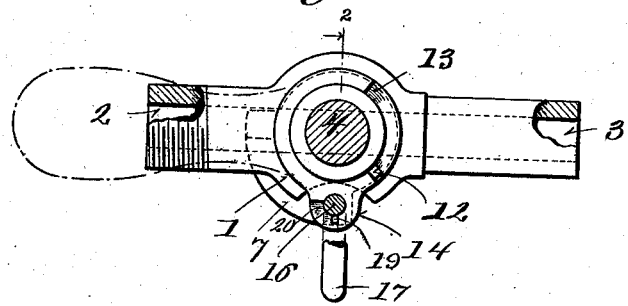
Figure 2:
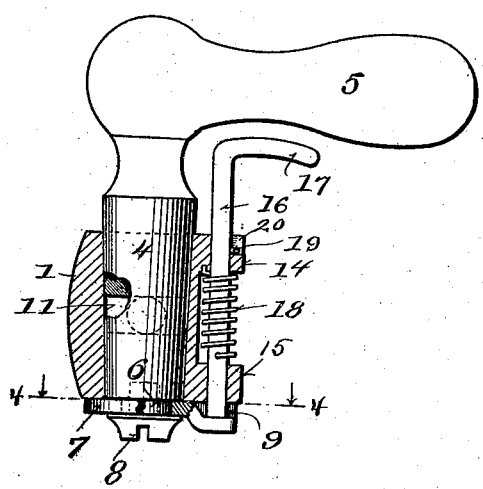
Figure 3:
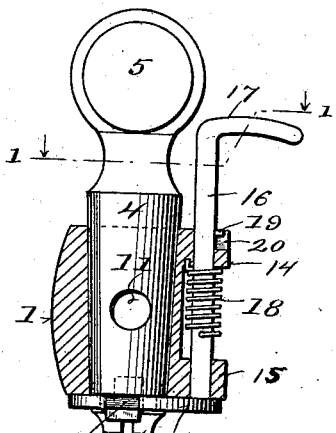
Figure 4:
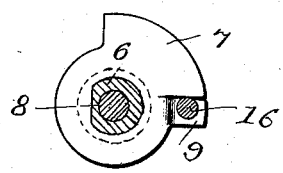
Figure 5:
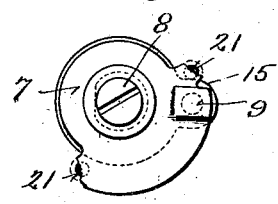

In the drawings: Figure 1 represents a plan view of a cock embodying the features of my invention, the view being partly in section, as indicated by line 1—1 of Fig. 3, and illustrates the position assumed by the mechanism when the cock is open; Fig. 2, a cross-section of the same showing the cock in its closed position, the section being indicated by line 2—2 of Fig. 1; Fig. 3, a similar cross-section showing the cock in its open position, Fig. 4, a detail section on line 4—4 of Fig. 2, showing the manner of attaching a locking-disk to the cock-plug and plunger for engaging the locking-disk, and Fig. 5, illustrates an inverted plan view of another form of locking-disk.

Referring by numerals to the drawings, 1 indicates a casing provided with the usual inlet and discharge openings 2, 3, the casing being also formed with a transverse tapered bore for the reception of a tapered plug 4, which plug is capped with a handle 5, as shown. The lower end of the plug has a projecting shank 6 flattened at one side, on which shank is fitted a locking-disk 7, the locking-disk being provided with an opening for this purpose, and is held in place by a cap-screw 8. By reason of the flattened side of the shank corresponding with a straight portion of the opening in the aforesaid disk, the latter is held against twisting upon said shank. The locking-disk is provided with an interruption or pocket 9, which is adapted to be engaged by a plunger 16, when the cock is closed.

The plug 4 has a cross-bored opening 11 in line with the openings 2, 3, in the casing, and when the said plug is turned to its open position, said opening therein registers with those of said casing, a quarter turn of the aforesaid plug being sufficient to cut off or close the cock. Limit of the motion of the plug is had by means of a pin 12 projecting from said plug and arranged to abut the ends of a recess 13 in the top of the casing.

Ears 14, 15, project from the casing at a right-angle to its openings, and fitted in apertures in the ears is the plunger 16 having a right-angle extension 17, which extension forms a gripping-trigger for the plunger. A spring 18 having one end fast to the plunger is coiled around the same and, the opposite end of the spring is secured in a recess of the ear 14. This spring serves to force the lower end of said plunger against the opposing face of the locking-disk, thus keeping the aforesaid plug 4 tight in its seat in the casing, and locking of the disk by the plunger is insured when the cock is closed.

When the handle 5 is moved to open the cock, it is first necessary to disengage the plunger from the pocket 9 of the disk, which plunger through its connection with the plug now holds the valve locked, as shown in Fig. 2, the handle being directly over and upon the same vertical plane as the gripping-trigger. The operator grasps said handle, at the same time lifting the gripping-trigger with the forefinger, this action frees the plunger from the disk-pocket and the plug together with the handle is then free to be swung over to the open position of the cock, in the movement of which the trigger follows, winding up the spring until such time as the end of the gripping-trigger slips from the grasp of the finger. The plunger is then brought back to its normal position by the torsion of said spring, at which point it is checked through a pin 19 extending from said plunger, the pin abutting the end-wall of a depression 20 in the ear 14, as best shown in Fig. 1, of the drawings.

From the foregoing it will be seen that a manual operation is required to unlock the cock, while to close the same it is only necessary to swing the handle back, the plunger in this case opposes on the unbroken surface of the locking-disk until the plug has made a quarter turn, at which time said plunger-end drops into the pocket and thereby automatically locks the cock. The advantage of such an arrangement as disclosed, is apparent from the fact that with my device it is impossible to accidentally open a gas-cock, a contingency that frequently occurs in cocks commonly used upon gas-stoves or burners of modern construction, the use of which causes much damage to life and property. And while a manual operation is required to unlock the device, it automatically locks, the plunger snapping into its pocket being apparent to the operator and indicating that the cock is full closed.

While I have shown and described mechanism in detail for carrying out my invention, it is to be understood that the details of construction may be varied without departing from the spirit of my invention.

The form of locking-disk illustrated in Fig. 5 of the drawings, is provided with stop-lugs 21 arranged to abut the ear 15, said stop-lugs limiting the movement of the cock-plug 4. The above construction renders it possible to dispense with the stop-pin 12 carried by the plug and its recess in the cock-casing.

I claim:

1. A stop-cock for gas-burners, comprising a casing, a plug fitted in the casing, a handle on the plug, a disk secured to the plug, the disk being provided with an interruption in its surface, and a spring-plunger secured to the casing adapted to engage the disk.

2. A stop-cock for gas-burners, comprising a casing, a plug fitted in the casing, a handle on the plug, a disk secured to the plug, the disk being provided with an interruption in its surface, a spring-plunger secured to the casing adapted to engage the disk, and a gripping-trigger on the plunger.

3. A stop-cock for gas-burners, comprising a casing, a plug fitted in the casing, and a handle on the plug, in combination with a disk secured to the plug and having an interrupted surface, stops projecting from the disk, and a hand-controlled spring-plunger secured to the casing for engagement with the interrupted surface of said disk.

In testimony that I claim the foregoing I have hereunto set my hand at Milwaukee in the county of Milwaukee and State of Wisconsin in the presence of two witnesses.

EMIL L. CLAUS.

Witnesses:
GEO. W. YOUNG,
GEORGE FELBER.